(12) United States Patent
Wang et al.

(10) Patent No.: US 12,177,785 B2
(45) Date of Patent: Dec. 24, 2024

(54) ENERGY SAVING SIGNAL TRANSMISSION METHOD, NETWORK-SIDE DEVICE AND TERMINAL

(71) Applicant: DATANG MOBILE COMMUNICATIONS EQUIPMENT CO., LTD., Beijing (CN)

(72) Inventors: Jiaqing Wang, Beijing (CN); Meiying Yang, Beijing (CN); Fang-Chen Cheng, Beijing (CN); Lei Wang, Beijing (CN); Zheng Zhao, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 417 days.

(21) Appl. No.: 17/599,555

(22) PCT Filed: Feb. 28, 2020

(86) PCT No.: PCT/CN2020/077296
§ 371 (c)(1),
(2) Date: Sep. 29, 2021

(87) PCT Pub. No.: WO2020/199813
PCT Pub. Date: Oct. 8, 2020

(65) Prior Publication Data
US 2022/0201614 A1 Jun. 23, 2022

(30) Foreign Application Priority Data

Mar. 29, 2019 (CN) .......................... 201910252570.2
Apr. 2, 2019 (CN) .......................... 201910263331.7

(51) Int. Cl.
*H04W 52/02* (2009.01)
*H04L 41/0806* (2022.01)
(Continued)

(52) U.S. Cl.
CPC ..... *H04W 52/0235* (2013.01); *H04L 41/0806* (2013.01); *H04W 72/23* (2023.01); *H04W 76/28* (2018.02)

(58) Field of Classification Search
CPC ............ H04W 52/0235; H04W 76/28; H04W 72/23; H04L 41/0806
See application file for complete search history.

(56) References Cited

U.S. PATENT DOCUMENTS

2008/0186892 A1* 8/2008 Damnjanovic ... H04W 52/0216
370/311
2008/0267105 A1* 10/2008 Wang .................. H04W 56/005
370/311
(Continued)

FOREIGN PATENT DOCUMENTS

CN 107735975 A 2/2018
CN 109155973 A 1/2019
(Continued)

OTHER PUBLICATIONS

Ericsson,"Triggers for NR UE power saving", 3GPP TSG-RAN WG1 Meeting AH-1901, Taipei, Taiwan, Jan. 21-25, 2019, total 13 pages, Tdoc R1-1901167.
(Continued)

*Primary Examiner* — Brenda H Pham
(74) *Attorney, Agent, or Firm* — Kilpatrick Townsend & Stockton LLP

(57) ABSTRACT

Disclosed are an energy saving signal transmission method, a network-side device and a terminal, relating wireless communications. The method of the present application comprises: a base station using higher-layer signaling/physical-layer signaling to configure, for a terminal, a first transmission opportunity for transmitting a first energy saving signal, and/or configure, for the terminal, a second transmission opportunity for transmitting a second energy saving
(Continued)

signal; and using the first transmission opportunity to transmit the first energy saving signal to the terminal, and/or using the second transmission opportunity to transmit the second energy saving signal to the terminal.

18 Claims, 4 Drawing Sheets

(51) Int. Cl.
*H04W 72/23* (2023.01)
*H04W 76/28* (2018.01)

(56) References Cited

U.S. PATENT DOCUMENTS

| | | | | |
|---|---|---|---|---|
| 2009/0318177 | A1* | 12/2009 | Wang | H04W 68/025 455/515 |
| 2012/0224519 | A1* | 9/2012 | Kwon | H04B 7/0452 370/329 |
| 2014/0204820 | A1* | 7/2014 | Wittberg | H04M 1/271 370/311 |
| 2016/0262118 | A1* | 9/2016 | Kim | H04W 52/365 |
| 2017/0171908 | A1* | 6/2017 | Agarwal | H04W 72/20 |
| 2018/0332533 | A1 | 11/2018 | Bhattad et al. | |
| 2019/0059129 | A1 | 2/2019 | Luo et al. | |
| 2019/0200351 | A1* | 6/2019 | Sun | H04L 5/0057 |

FOREIGN PATENT DOCUMENTS

| | | |
|---|---|---|
| CN | 109309555 A | 2/2019 |
| CN | 109429318 A | 3/2019 |
| WO | 2018174635 A1 | 9/2018 |
| WO | 2018203627 A1 | 11/2018 |

OTHER PUBLICATIONS

Huawei et al.,"Power saving schemes", 3GPP TSG RAN WG1 Meeting #96, Athens, Greece, Feb. 25-Mar. 1, 2019, total 20 pages, R1-1901572.

Spreadtrum Communications,"Remaining issues on evaluation methodology for UE power saving",3GPP TSG RAN WG1 Meeting #96, Athens, Greece, Feb. 25-Mar. 1, 2019, total 9 pages, R1-1902734.

Zte et al.,"Consideration on Power Saving Signal", 3GPP TSG-RAN WG2 Meeting #105 bis, Xi'an, China, Apr. 8-Apr. 12, 2019, total 5 pages, R2-1903396.

Media Tek Inc.,"Wake Up Signal Configuration for NB-IoT", 3GPP TSG RAN WG1 Meeting #92, Athens, Greece, Feb. 26-Mar. 2, 2018, total 6 pages, R1-1801683.

* cited by examiner

ENERGY SAVING SIGNAL TRANSMISSION METHOD, NETWORK-SIDE DEVICE AND TERMINAL

CROSS-REFERENCE OF RELATED APPLICATIONS

The present application is a National Stage of International Application No. PCT/CN2020/077296, filed on Feb. 28, 2020, which claims the priorities from Chinese Patent Application No. 201910252570.2 filed with the Chinese Patent Office on Mar. 29, 2019 and entitled "Energy Saving Signal Transmission Method, Network-Side Device and Terminal" and Chinese Patent Application No. 201910263331.7 filed with the Chinese Patent Office on Apr. 2, 2019 and entitled "Energy Saving Signal Transmission Method, Network-Side Device and Terminal", which are hereby incorporated by reference in their entirety.

FIELD OF DISCLOSURE

The present application relates to the field of wireless communication technologies, and in particular to an energy saving signal transmission method, a network-side device and a terminal.

BACKGROUND

In the 5G New Radio (NR) system, the power-saving design of a User Equipment (UE) has become very necessary. The main reason is that the 5G supports the larger bandwidth, higher throughput, and more complex services and more complex processing technologies matching with them. The power-saving optimization design can save the power consumption of the terminal, extend the lifetime of the battery, and thus improve the user experience, so it is very important for the 5G industrialization.

At present, the 3rd Generation Partnership Project (3GPP) mainly discusses two energy saving signals/schemes on NR energy saving.

Scheme 1: the energy saving signal is designed based on sequence, for example, it can be the existing Channel State Information-Reference Signal (CSI-RS) of the NR or a newly-designed energy saving signal based on sequence.

Scheme 2: the energy saving signal is designed based on the Physical Downlink Control Channel (PDCCH), and this scheme requires the UE to wake up the radio frequency and baseband demodulation and decoding module. Compared with the sequence-based energy saving signal, the power consumption is higher, but there is no energy saving signal that needs to detect the PDCCH within the Discontinuous Reception ON (DRX ON) period, which greatly saves the power consumption in comparison. At the same time, the Downlink Control Information (DCI) of the energy saving signal based on PDCCH may have the larger capacity and may transmit a large number of information bits to support the energy saving and spectrum efficiency improvement in the DRX ON.

To sum up, the 3GPP currently gives a discussion on energy saving signals and gives possible candidates for energy saving signals, namely sequence-based energy saving signals and PDCCH-based energy saving signals. However, there is no specific solution on how to transmit the PDCCH-based energy saving signal.

BRIEF SUMMARY

The present application provides an energy saving signal transmission method, a network side device and a terminal, to solve the problem in the prior art that there is no specific solution on the transmission of the PDCCH-based energy saving signal.

In a first aspect, an embodiment of the present application provides an energy saving signal transmission method, which includes: configuring a first transmission opportunity to transmit a first energy saving signal and/or configuring a second transmission opportunity to transmit a second energy saving signal for a terminal through a higher-layer signaling or a physical-layer; and using the first transmission opportunity to transmit the first energy saving signal to the terminal, and/or using the second transmission opportunity to transmit the second energy saving signal to the terminal.

In a second aspect, an embodiment of the present application provides an energy saving signal transmission method, which includes: detecting a first energy saving signal according to a first transmission opportunity configured by a base station through a higher-layer signaling or a physical-layer; and/or detecting a second energy saving signal according to a second transmission opportunity configured by the base station through a higher-layer signaling or a physical-layer.

In a third aspect, an embodiment of the present application provides a network-side device for energy saving signal transmission, including: a processor, a memory and a transceiver; wherein the processor is configured to read computer instructions in the memory to perform the following steps: configuring a first transmission opportunity to transmit a first energy saving signal and/or configuring a second transmission opportunity to transmit a second energy saving signal for a terminal through a higher-layer signaling or a physical-layer; and using the first transmission opportunity to transmit the first energy saving signal to the terminal, and/or using the second transmission opportunity to transmit the second energy saving signal to the terminal.

In a fourth aspect, an embodiment of the present application provides a terminal for energy saving signal transmission, including: a processor, a memory and a transceiver; wherein the processor is configured to read computer instructions in the memory to perform the following steps: detecting a first energy saving signal according to a first transmission opportunity configured by a base station through a higher-layer signaling or a physical-layer; and/or detecting a second energy saving signal according to a second transmission opportunity configured by the base station through a higher-layer signaling or a physical-layer.

In a fifth aspect, the present application further provides a computer readable storage medium storing computer instructions thereon, wherein the computer instructions, when executed by a processor, implements the steps of the method described in the first aspect or implements the steps of the method described in the second aspect.

BRIEF DESCRIPTION OF THE DRAWINGS

The embodiments of the present application are explained more clearly by the accompanying figures which need to be used in describing the embodiments will be introduced below briefly. The accompanying figures described below are only some embodiments of the present application.

DETAILED DESCRIPTION OF THE EMBODIMENTS

Some words that appear herein will be explained below.

The term "and/or" in the embodiments of the present application describes the association relationship of associated objects, indicating that there may be three relationships, for example, A and/or B may represent: only A, both A and B, and only B. The character "/" generally indicates that the associated objects have a kind of "or" relationship.

In the 5G New Radio (NR) system, the current working states of the UE are divided into three types: Radio Resource Control_IDLE (RRC_IDLE) state, Radio Resource Control_Inactive (RRC_Inactive) state, and Radio Resource Control_Connected (RRC_Connected) state.

Figure 1:
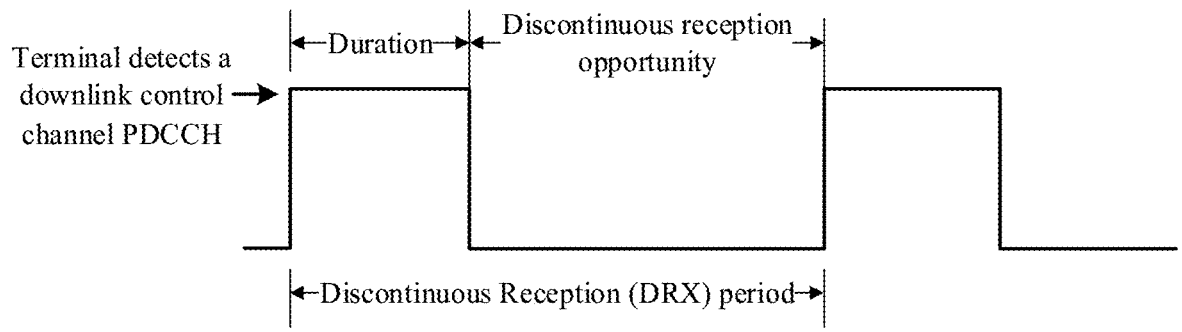
FIG. 1 is a schematic diagram of a method for transmitting an energy saving signal in a DRX period provided in a specific embodiment of the present application.

When a UE is in the RRC_IDLE or RRC_Inactive state, the UE needs to monitor the paging signal. When the UE receives a paging signal, it means that the network side has data to send, and the UE needs to enter the RRC_Connected state to receive the downlink data. In the RRC_Connected state, the UE needs to continuously monitor the PDCCH to learn the transmission information of the Physical Downlink Shared Channel (PDSCH). The packet-based data stream is usually bursty, and there is data transmission for a period of time, but there is no data transmission for a next long period of time, and the continuous monitoring of the PDCCH will inevitably lead to the rapid power consumption of the UE. Therefore, when there is no data transmission, it is possible to stop receiving the PDCCH (stop the blind detection of the PDCCH at this time) to reduce the power consumption. Therefore, the design of 3GPP is to achieve the purpose of power saving through the Discontinuous Reception (DRX) mechanism. As shown in FIG. 1, in the DRX period, the UE only monitors the PDCCH in the On duration period, and the UE does not receive the PDCCH to reduce the power consumption, i.e., enters the sleep mode in the "Opportunity for DRX", i.e., the DRX off time.

In order to quickly respond to the scheduling of the base station and reduce the delay of the UE, it may be difficult to set the off period in the DRX as the longer time in the mobile communication system, so that the frequent DRX on/off periods are needed for the UE, which greatly reduces the power saving effect.

Figure 2:
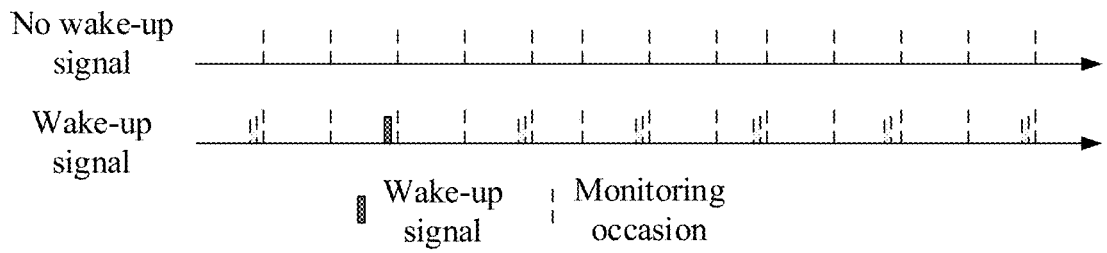
FIG. 2 is a schematic diagram of a wake-up signal transmission method in the narrowband Internet of Things provided in a specific embodiment of the present application.

The addition of a Wake Up Signal (WUS) to trigger the paging signal detection is considered in the study of the power consumption of the Narrowband Internet of Things (NB-IoT), as shown in FIG. 2.

The dashed vertical line in FIG. 2 represents the paging opportunity (PO). When there is no WUS, the UE in the RRC_IDLE state needs to wake up periodically to receive possible paging signals at various monitoring positions. The UE needs to blindly detect the PDCCH of the paging signal before each detection of possible paging signals. If the PDCCH of the paging signal is seen, the UE continues to decode the paging signal, otherwise it will not decode again. Another method is to send a WUS before the paging signal. If a WUS is detected, the PDCCH of the paging starts to be blindly detected; and if no WUS is detected, the detection of paging signals within PO is abandoned. Since the WUS can be designed as a sequence of which the detection complexity is much lower than that of blind detection of the PDCCH, the usage of the WUS can greatly reduce the receiving power consumption.

The NR system has three states: RRC_IDLE/RRC_Inactive/RRC_Active. With reference to the NB-IoT idea, the base station sends a power saving signal during the Opportunity for DRX period. If the UE detects the power saving signal before DRX ON, it will monitor the PDCCH during the subsequent DRX ON period; otherwise, it continues to sleep and does not detect the PDCCH during the DRX ON period.

At present, two energy saving signals/schemes are mainly discussed for NR energy saving:

Scheme 1: the energy saving signal is designed based on sequence, for example, it can be the existing Channel State Information-Reference Signal (CSI-RS) of the NR or a newly-designed energy saving signal based on sequence;

Scheme 2: the energy saving signal is designed based on the PDCCH, and this scheme requires the UE to wake up the radio frequency and baseband demodulation and decoding module. Compared with the sequence-based energy saving signal, the power consumption is higher, but there is no energy saving signal that needs to detect the PDCCH within the DRX ON period, which greatly saves the power consumption in comparison. At the same time, the DCI of the energy saving signal based on PDCCH may have the larger capacity and may transmit a large number of information bits to support the energy saving and spectrum efficiency improvement in the DRX ON. The aforementioned energy saving signal is used to determine whether to wake up the UE receiver to monitor the PDCCH in DRX ON, and can be regarded as an energy saving signal with the wake up function. In addition to waking up the UE receiver to monitor the PDCCH, the energy saving signal can further be used to instruct the UE to enter the sleep mode. The so-called sleep mode is the mode in which the UE does not monitor the PDCCH. If the time of the sleep mode is longer, the UE can enter the deep sleep mode, that is, turn off the radio frequency and most of the baseband modules and reserve only a few necessary modules such as clock maintenance; or can enter the light sleep mode, that is, turn off some Radio Frequency (RF) and baseband modules and not monitor the PDCCH; or can enter the micro sleep mode, in which there is no need to turn off the RF and baseband but no data is received and no PDCCH is detected, and the detection of PDCCH can be quickly resumed.

Based on the foregoing scenarios, the present application provides an energy saving signal transmission method, a base station and a terminal.

In view of the foregoing scenarios, the embodiments of the present application will be further described in detail below in combination with the accompanying drawings of the specification.

Figure 3:
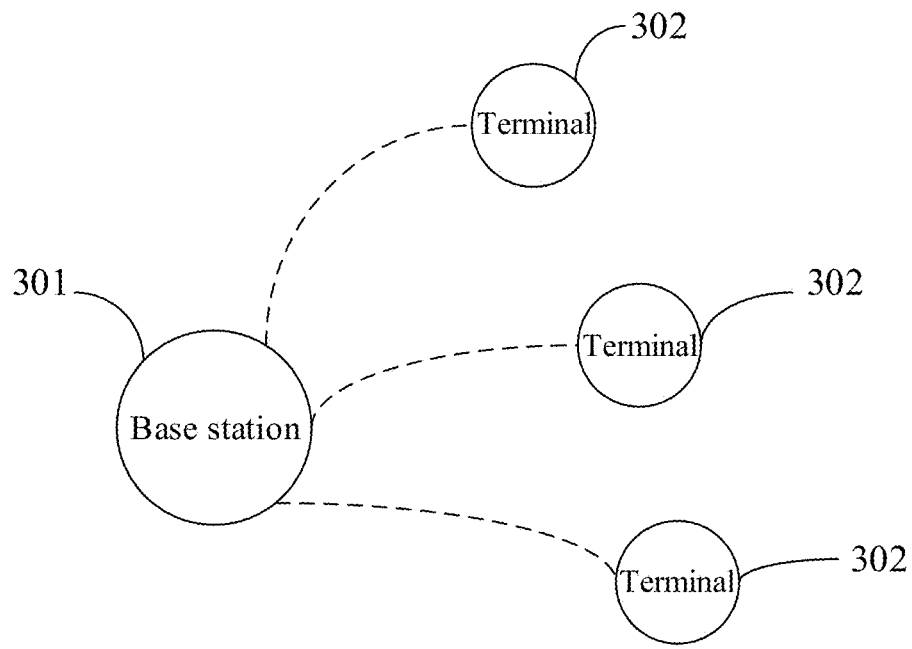
FIG. 3 is a schematic diagram of a system for energy saving signal transmission provided by an embodiment of the present application.

As shown in FIG. 3, this embodiment provides a system for energy saving signal transmission, which includes at least one base station 301 and at least one terminal 302 (User Equipment).

Here, the base station is used to configure a first transmission opportunity to transmit a first energy saving signal and/or configure a second transmission opportunity to transmit a second energy saving signal for a terminal through higher-layer signaling/physical-layer signaling; and use the first transmission opportunity to transmit the first energy saving signal to the terminal, and/or use the second transmission opportunity to transmit the second energy saving signal to the terminal.

The UE is used to detect the first energy saving signal according to the first transmission opportunity configured by the base station through higher-layer signaling/physical-layer signaling; and/or detect the second energy saving signal according to the second transmission opportunity configured by the base station through higher-layer signaling/physical-layer signaling.

It should be understood that the energy saving signal in this embodiment is a signal transmitted based on PDCCH, and includes any one or a combination of:

a first energy saving signal with wake-up function;

a second energy saving signal with sleep function.

For the UE, the first transmission opportunity of the energy saving signal can be called "wake up Monitoring Occasion (MO)", and the second transmission opportunity can be called "go to sleep Monitoring Occasion". The above-mentioned "wake up Monitoring Occasion" and "go to sleep Monitoring Occasion" are both denoted by MO hereafter.

The transmission opportunities (including the first transmission opportunity and the second transmission opportunity) and the Monitoring Occasion (MO) of the energy saving signals described above are defined separately from the perspective of the base station and the terminal. They will not be distinguished below for simple and convenient description.

Figure 4:
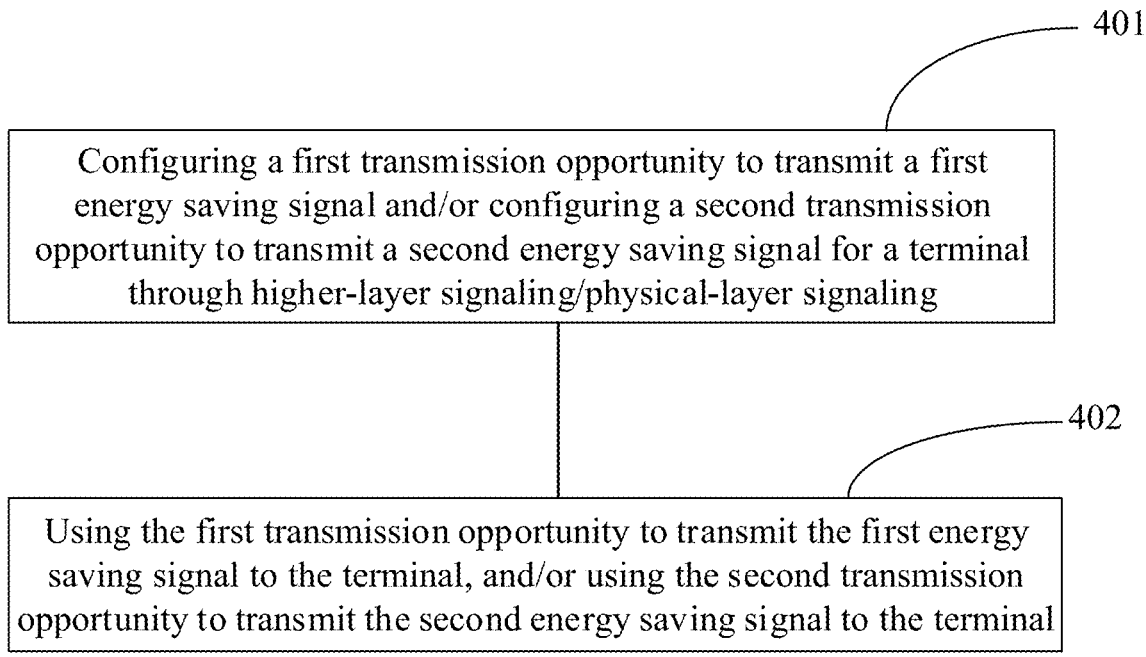
FIG. 4 is a schematic diagram of an energy saving signal transmission method applicable to a base station provided by an embodiment of the present application.

Based on the foregoing system, as shown in FIG. 4, this embodiment provides an energy saving signal transmission method applicable to the base station 301. The method includes following steps.

Step 401: configuring a first transmission opportunity to transmit a first energy saving signal and/or configuring a second transmission opportunity to transmit a second energy saving signal for a terminal through higher-layer signaling/physical-layer signaling.

The first energy saving signal may be a first energy saving signal with the wake-up function to instruct the terminal to perform the wake-up operation; and the second energy saving signal may be a second energy saving signal with the sleep function to instruct the terminal to perform the sleep operation.

Step 402: using the first transmission opportunity to transmit the first energy saving signal to the terminal, and/or using the second transmission opportunity to transmit the second energy saving signal to the terminal.

In one embodiment, there are several cases as follows:
A. The base station only configures a first transmission opportunity to transmit the first energy saving signal with the wake-up function for the terminal, and uses the first transmission opportunity to transmit the first energy saving signal to the terminal;
B. The base station only configures a second transmission opportunity to transmit the second energy saving signal with the sleep function for the terminal, and uses the second transmission opportunity to transmit the second energy saving signal to the terminal;
C. The base station simultaneously configures a first transmission opportunity to transmit the first energy saving signal with the wake-up function and a second transmission opportunity to transmit the second energy saving signal with the sleep function for the terminal, and uses the first transmission opportunity to transmit the first transmission opportunity to the terminal and uses the second transmission opportunity to transmit the second energy saving signal to the terminal.

The base station configures the first transmission opportunity in a first period and/or configures the second transmission opportunity in a second period for the terminal through higher-layer signaling/physical-layer signaling, that is, the first transmission opportunity appears in the first period, and the second transmission opportunity appears in the second period, where the configuration mode may be semi-static/static/dynamic mode.

In the above step 401, when the base station configures the first transmission opportunity and/or configures the second transmission opportunity for the terminal, the step includes any one or a combination of:

in a specified period in the DRX period, a first preset number of first transmission opportunities is configured for the terminal, and specifically the first period may be set according to the first preset number, and the first period is less than the DRX period;

in a specified period in the DRX period, a transmission opportunity after a designated transmission opportunity is configured for the terminal as the second transmission opportunity.

It should be understood that the specified period in the DRX period may be, but is not limited to, a subset period of the DRX period determined by the base station and the terminal in a pre-agreed manner.

In the above step 401, when the base station configures the first transmission opportunity and/or configures the second transmission opportunity for the terminal, the base station may further configure a third transmission opportunity to instruct the terminal to skip the detection of energy saving signals for the terminal, to instruct the terminal not to perform the detection of energy saving signals on the third transmission opportunity.

The third transmission opportunity may be between the first transmission opportunity and the second transmission opportunity, or may not be between the first transmission opportunity and the second transmission opportunity.

As a possible case, if there are 50 transmission opportunities in a period, the first five transmission opportunities can be regarded as the first transmission opportunities, the transmission opportunities after the $11^{th}$ transmission opportunity are regarded as the second transmission opportunities, and the $6^{th}$ to $11^{th}$ transmission opportunities are set as the third transmission opportunities.

The base station can further notify the terminal of the third transmission opportunity on which the energy saving signals are not detected semi-statically through RRC signaling, or configure and notify the terminal of the third transmission opportunity on which the energy saving signals are not detected statically according to a pre-agreed manner. For example, when the base station and the terminal statically agree that only one transmission opportunity in DRX OFF is used to transmit the first transmission opportunity, the base station can notify the terminal to ignore the third transmission opportunities that are not used to transmit the first energy saving signal in a semi-static or static manner. This is also applicable to other subsequent specific embodiments, that is, the terminal does not detect the first energy saving signal on the ignored or skipped detection occasion MO (third transmission opportunity) of the first energy saving signal configured by the base station.

The base station restricts the search space corresponding to the first energy saving signal, so that the Aggregation Level (AL) corresponding to the search space does not exceed a preset aggregation level L and the total number of candidates corresponding to the aggregation level does not exceed the preset number T of candidates.

In a better case, L=2 or 1; when L=2, the number of ALs is set to 4 or 8, or 8, 16, or 4, 16; when L=1, the number of ALs is set to 4 or 8 or 16. The specific value of L can be configured by the base station through RRC signaling.

The above-mentioned total number T of candidates is equal to 16 or 8 or 4 or 2 or 1.

It should be pointed out that the number of candidates under different aggregation levels is independently configured in the NR standard, and may be at most 8. For example, when the total number of candidates is T=2, if the number of ALs is equal to 2, then AL=4 and 8 respectively. At this time, one candidate can be configured for each AL level. The limitation on the number of aggregation levels and the number of candidates will definitely affect the scheduling flexibility of the base station, but too many candidates will increase the number of blind detections of energy saving signals based on PDCCH, increase the processing time of the UE and thus increase the power consumption of the UE.

From the perspective of saving the power consumption, the total number T of candidates based on energy saving signals may be set to 1, and the aggregation level is set to 8. The base station can send the first energy saving signal with the wake-up function on one or more transmission opportunities; and for the second energy saving signal with the sleep function transmitted in the second period, there is no need to limit the search space because the terminal is already in the wake-up state.

Embodiments of the energy saving signal transmission method provided in the embodiments of the present application will be given below.

First Embodiment

In this embodiment, the base station configures the first transmission opportunity in a first period and/or configures the second transmission opportunity in a second period for the terminal through higher-layer signaling/physical-layer signaling, and the first transmission opportunity is different from the second transmission opportunity.

In one embodiment, the base station transmits the first energy saving signal with the wake-up function with the first period and transmits the second energy saving signal with the sleep function with the second period, and the first period is different from the second period.

In an implementation, the first period and the second period can be, but not limited to, configured semi-statically by the base station for the terminal through RRC signaling, or configured statically by the base station for the terminal through a pre-agreed method.

The above other ways include: the base station informs the terminal of the first period and the second period by way of dynamic signaling through the physical layer or MAC layer, or the base station broadcasts in the system information to indicate the configured first period and second period to the terminal.

The second period is different from the first period, and the second period is always smaller than the DRX period, to clearly distinguish the first energy saving signal with the wake-up function from the second energy saving signal with the sleep function.

In an implementation, the base station configures the first period to be greater than the second period, and the magnitude of the second period is the same as the PDCCH period for data scheduling, to reduce the terminal's detection of wake-up signals as possible, and lower the power consumption of the terminal from the sleep state to the awake state. Also, the second period for transmitting the second energy saving signal with the sleep function is consistent with the PDCCH period for data scheduling. At this time, the second energy saving signal with sleep function and the PDCCH for data scheduling can be designed to be carried by the same DCI, so it is beneficial to reduce the number of different PDCCH types detected by the terminal, and thus reduce the power consumption of the terminal.

The first period can be, but is not limited to, any one of: a DRX period, a multiple of the DRX period, a product of the DRX period and a preset value, and the preset value is a scaling factor less than 1.

When the first period is equal to the DRX period or a multiple of the DRX period, there is at most one first energy saving signal with wake-up function in each DRX period, and the first energy saving signal can be in the DRX ON period or in the DRX OFF period.

If the UE detects the first energy saving signal on the corresponding MO, the UE monitors the PDCCH in the corresponding DRX On period, and stops detecting on the MOs corresponding to the subsequent first energy saving signals, to avoid the base station from being awakened many times in the DRX period, and saving the power consumption. The terminal receives the second energy saving signal indicating that the PDCCH is no longer monitored, and performs the sleep operation, and saving the power consumption.

When the first period is less than the DRX period, there are multiple transmission opportunities for transmitting the first energy saving signal with wake-up function in the DRX period. The base station may select one of the multiple first transmission opportunities to transmit the first energy saving signal, or may send the first energy saving signal on the multiple first transmission opportunities.

Figure 5:
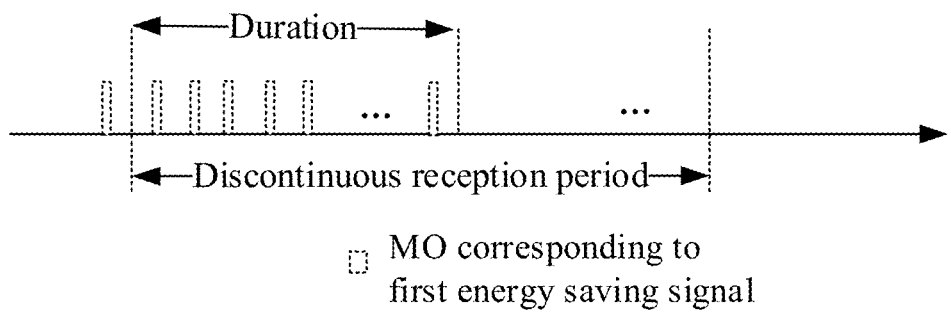
FIG. 5 is a schematic diagram of a transmission opportunity of an energy saving signal provided by Embodiment 1 of the present application.

Referring to FIG. 5, In one embodiment, the base station firstly determines the specific locations of the transmission opportunities of the energy saving signals, and the base station transmits the first energy saving signal with the wake-up function on the corresponding transmission opportunity. Correspondingly, the UE detects the first energy saving signal at the MO corresponding to the first transmission opportunity.

In one embodiment, when there are multiple first transmission opportunities for transmitting the first energy saving signal with wake-up function in the DRX period, the base station may transmit the first energy saving signal in the following manner.

1) The base station selects a first transmission opportunity of the first energy saving signal according to the sending time of the data in DRX ON.

If the data does not arrive before the DRX ON period but arrives within the current DRX ON period, the transmission opportunity before the data transmission and closer to the data transmission position is selected as the first transmission opportunity to send the first energy saving signal, in order to facilitate reducing the scheduling delay of the above data.

Even if the above data has been prepared before DRX ON, but there are multiple slots from the position for sending the data to the starting point of DRX ON, the first energy saving signal will generally notify the terminal that it needs to skip N PDCCH monitoring opportunities after receiving the first energy saving signal, and reducing the opportunities for the terminal to blindly detect the PDCCH before the data arrives.

Since the N value is flexible and variable in practice, when the N value is indicated to the terminal by means of dynamic indication, the large overhead is required when the N value is large; and the pre-configured N PDCCH detection opportunities may be indicated in a semi-static way (such as, represented by 1 bit). But if the distance from the position of the transmission opportunity for the actual transmission of the energy saving signal to the sending position of the PDSCH is far beyond the N PDCCH detection opportunities, it is not conducive to further detect the energy saving signals. Therefore, this embodiment provides another method for selecting a specific first transmission opportunity from multiple transmission opportunities, as follows.

The position of the transmission opportunity of the energy saving signal is configured before the scheduled data, and the distance from the scheduled data is greater than the preset position threshold.

There may be multiple transmission opportunities of energy saving signals that meet the above conditions. In a better case, the transmission opportunity closest to the scheduled data is selected as the first transmission opportunity. In practice, the base station can also select other transmission opportunity as the first transmission opportunity to transmit the first energy saving signal according to the actual situation of resource scheduling.

The preset position threshold can be determined in the following manner: when N PDCCH monitoring opportunities that need to be skipped are configured by using a semi-static configuration method, the threshold is determined as: the distance from the transmission position of the energy saving signal to the scheduled data is more than N PDCCH detection opportunities.

Although the above method of determining the preset position threshold causes a need for the UE to detect energy saving signals on multiple MOs, the case where the terminal detects energy saving signals at multiple detection occasions (MOs) saves the energy consumption compared with the case where more intensive scheduling PDCCH is detected when the period of the energy saving signal is greater than the data scheduling period.

2) The base station transmits the first energy saving signal on multiple transmission opportunities in DRX ON.

When the base station transmits the same first energy saving signal on multiple first transmission opportunities, the terminal can jointly detect the first energy saving signal of multiple transmission opportunities, and improving the detection performance of the first energy saving signal and ensuring that the UE is awakened. Once the UE detects out one or more first energy saving signals successfully, it stops detecting the first energy saving signal on other MOs and can send the ACK/NACK to the base station. After receiving the ACK/NACK of the awakened UE, the base station stops sending the first energy saving signal on the first transmission opportunities at subsequent positions after the transmission opportunity to send the first energy saving signal last time.

When sending the first energy saving signal on the multiple first transmission opportunities, the base station may further determine the maximum number of first transmission opportunities allowed to transmit the first energy saving signal during a DRX ON period through the semi-static configuration of RRC signaling or in a pre-agreed manner.

For example, the base station and the terminal agree that at most the first M MOs in DRX ON are used to transmit the first energy saving signal with wake-up function. Correspondingly, the terminal does not detect the first energy saving signal on the transmission opportunities of energy saving signals other than these M MOs, and saving the power consumption.

When the first period is less than the DRX period, there are multiple transmission opportunities for transmitting the second energy saving signal with sleep function in the DRX period. When the base station sends different second energy saving signals on transmission opportunities of different second energy saving signal, the terminal needs to detect different second energy saving signals on the MOs corresponding to different second energy saving signals. At this time, the base station can semi-statically configure the number of transmission opportunities that are actually used to send the second energy saving signals through RRC signaling, to avoid the UE from detecting the second energy saving signals on multiple MOs.

As another embodiment, the base station transmits the first energy saving signal with the wake-up function with the first period and transmits the second energy saving signal with the sleep function with the second period, and the first transmission opportunity is different from the second transmission opportunity, and the first period is different from the second period.

The first period and the second period can be the same but not limited to the following cases.

1) The second period is the same as the first period, but the respective time offsets are different.

The above offset can be understood as the time offset, gap, or symbol-level offset of the energy saving signal in each transmission period relative to the start position of this transmission period.

2) The first period is equal to the second period, and the offsets corresponding to the periods are also the same.

In a specific implementation, any of the following methods can be used.

(1) The slot configurations of the first energy saving signal with the wake-up function and the second energy saving signal with the sleep function that need to be detected in the same transmission period are different.

In the NR standard, slots can be configured in each transmission period to detect the PDCCH. The terminal can be notified that the first energy saving signal with wake-up function and the second energy saving signal with sleep function respectively occupy different slots in the same transmission period through the signaling configuration method of the base station or in a pre-agreed static manner, to realize different slot configurations that need to be detected in the same transmission period.

In one embodiment, the terminal may be dynamically notified of the above different slot configurations through the semi-static mode of RRC signaling or through physical layer/MAC layer signaling. When the physical-layer signaling is used to dynamically notify the terminal of the above different slot configurations, the slots used to transmit the first energy saving signal/second energy saving signal can be notified in the manner of bit map.

(2) The base station notifies the terminal semi-statically through higher-layer signaling or notifies the terminal in a pre-agreed static manner or through physical layer/MAC layer dynamic signaling, and specifically notifies the terminal of the first transmission opportunity for transmitting the first energy saving signal and the second transmission opportunity for transmitting the second energy saving signal.

It should be understood that, for the terminal, the terminal determines the MO for detecting the first energy saving signal and the MO for detecting the second energy saving signal according to the notification from the base station; that is, the base station informs the terminal of which MOs are used to transmit the first energy saving signal with wake-up function and which MOs are used to transmit the second energy saving signal with sleep function.

In one embodiment, for MOs of multiple energy saving signals in the discontinuous reception on (DRX ON) period, the base station may further indicate a third transmission opportunity for skipping detection (i.e., MO for skipping detection) to the terminal, that is, the base station does not transmit the energy saving signal on the third transmission opportunity. Correspondingly, the terminal does not perform the detection of the energy saving signal on the MO for skipping detection according to the instruction of the base station.

The base station can notify the terminal that the first few transmission opportunities that start in the discontinuous reception off (DRX OFF) period or discontinuous reception on (DRX ON) period are the first transmission opportunities, and transmit the first energy saving signal with wake-up function on the above first transmission opportunities; but the transmission opportunities after a certain transmission opportunity is the second transmission opportunities, and the second energy saving signal with sleep function is transmitted on the above second transmission opportunities.

Correspondingly, after receiving the notification from the base station, the terminal detects the first energy saving signal with wake-up function on the first few detection occasions (MOs) that start in the discontinuous reception off (DRX OFF) period or discontinuous reception on (DRX ON) period, and detects the second energy saving signal with sleep function after the MO corresponding to a certain transmission opportunity mentioned above.

Figure 6:
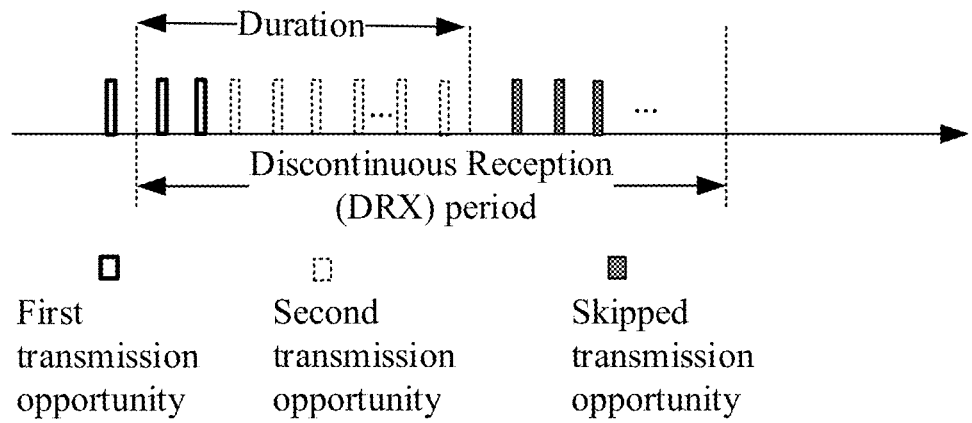
FIG. 6 is a schematic diagram of different periods for transmitting energy saving signals provided by Embodiment 1 of the present application.

As shown in FIG. 6, for the terminal, the MO of the first energy saving signal with wake-up function is located at the start position of DRX OFF or DRX ON (that is, for the base station, the first transmission opportunity of the first energy saving signal with wake-up function is located at the start position of DRX OFF or DRX ON), the MO of the second energy saving signal with sleep function is located after the MO corresponding to the first energy saving signal, and there are several MOs for skipping detection between the MO corresponding to the first energy saving signal and the MO corresponding to the second energy saving signal; that is, after receiving the notification from the base station, the terminal detects the first energy saving signal with wake-up function on the MO corresponding to the first energy saving signal, detects the second energy saving signal with sleep function on the MO corresponding to the second energy saving signal, and skips the detection of energy saving signals (that is, does not detect energy saving signals) directly on the above MOs for skipping detection.

It should be understood that the above MOs for skipping detection may or may not exist.

When the first transmission opportunity is not equal to the second transmission opportunity, the functions of the first energy saving signal and the second energy saving signal are different as follows:

1) The first energy saving signal transmitted in the first period is only used for waking up the receiver but not for data scheduling;
2) The second energy saving signal transmitted in the second period only instructs the terminal to perform the sleep operation, or instructs the terminal to perform the sleep operation and schedule the data;
3) The PDCCH for scheduling data is transmitted in the third period, which is a subset of the first transmission opportunities and second transmission opportunities.

In the above 1), when the first energy saving signal transmitted in the first period is only used to wake up the receiver, the DCI corresponding to the first energy saving signal is different from the DCI for data scheduling and does not include the necessary control information related to data scheduling.

The foregoing necessary control information may include, but is not limited to, resource allocation, modulation, (Hybrid Automatic Repeat reQuest, HARQ) and other related information.

In the above 2), the second energy saving signal transmitted by the base station in the second period may include a data scheduling field in addition to a sleep field, so the sleep field can be expanded on the basis of the DCI for data scheduling to form the new DCI.

As in one embodiment, the terminal detects the second energy saving signal with sleep function on the MO corresponding to the second energy saving signal, and the DCI corresponding to the second energy saving signal includes a sleep field that can instruct the terminal to continue detecting the next PDCCH, or skip the detection of N PDCCHs, or stop detecting the subsequent PDCCHs during DRX ON; and the UE can be supported to enter different sleep modes.

As in another embodiment, the terminal detects the second energy saving signal with sleep function on the MO corresponding to the second energy saving signal, and performs the sleep operation according to the instruction of the sleep field in the DCI corresponding to the second energy saving signal, to support the UE to enter the same sleep mode.

In one embodiment, the PDCCH for scheduling data is transmitted in the third period. As an embodiment, the third period is less than or equal to the first period and the second period, and the first transmission opportunity corresponding to the first period and the second transmission opportunity corresponding to the second period is a subset of the transmission opportunities corresponding to the third period.

Figure 7:
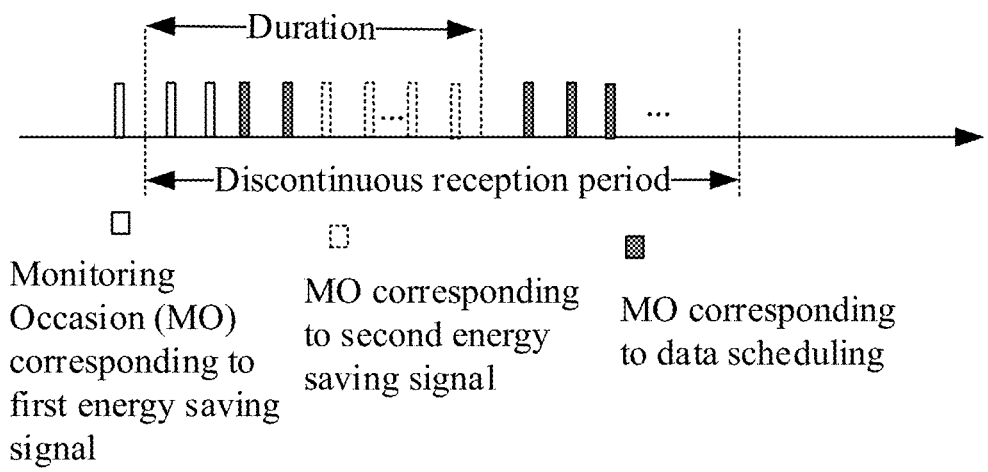
FIG. 7 is a schematic diagram of transmitting a first energy saving signal provided by Embodiment 1 of the present application.

As shown in FIG. 7, the first period, the second period, and the third period are the same in size. The base station configures different transmission opportunities through the aforementioned signaling to transmit the first energy saving signal, the second energy saving signal and the PDCCH for data scheduling, and the DCI of the first energy saving signal, the second energy saving signal and the scheduling data uses the same DCI length to reduce the complexity of blind detection of multiple PDCCH signals by the terminal, and reducing the power consumption of the terminal.

In one embodiment, the DCI of the energy saving signal and the scheduling data may be the same DCI, which includes three fields: a wake-up field, a sleep field, and a data scheduling field.

For example, the sleep field and the data scheduling field in the DCI are deactivated on the MO corresponding to the first energy saving signal with the wake-up function; the deactivation can be, but is not limited to, setting the values of bits on the sleep field and the data scheduling field to the designated known values, and the above known values may be zero, that is, the values of the bits on the sleep field and the data scheduling field may be all set to zero.

On the terminal side, the above known values can be the frozen bits for polar decoding opposite to the control channel, to improve the decoding performance.

For example, the wake-up field in the DCI is deactivated on the MO corresponding to the second energy saving signal with the data scheduling function and the sleep function; and the DCI may contain the activated sleep field and data scheduling field at the same time on the MO corresponding to the first energy saving signal with the sleep function and the data scheduling.

It should be understood that all the bits of the deactivated fields can be used to assist Polar decoding after being set to 0.

Second Embodiment

In this embodiment, the base station configures the first transmission opportunity in a first period and/or configures the second transmission opportunity in a second period for the terminal through higher-layer signaling/physical-layer signaling, and the first transmission opportunity is the same as the second transmission opportunity.

The base station transmits the first energy saving signal with wake-up function in the first period and uses the second transmission opportunity to transmit the second energy saving signal with sleep function. The first period is equal to the second period, and the first period and the second period have the same offset. At this time, the energy saving signals with two functions (the first energy saving signal and the second energy saving signal) have the same transmission opportunity, and the first energy saving signal or the second energy saving signal may exist on each transmission opportunity.

As an embodiment, the transmission periods of the two energy saving signals are configured semi-statically through RRC signaling, or configured statically in a pre-agreed manner and notified to the terminal.

For the terminal, there may be two energy saving signals on each MO.

As in one embodiment, the base station configures different search spaces respectively for the first energy saving signal with wake-up function and the second energy saving signal with sleep function, which are carried by different DCIs.

In another embodiment, the base station configures the first energy saving signal with wake-up function and the second energy saving signal with sleep function to be carried by the same DCI, and neither of them is used for data scheduling.

There is a type indication field that indicates the type of an energy saving signal in the DCI, to indicate to the terminal that the energy saving signal is the first energy saving signal, or that the energy saving signal is the second energy saving signal, or that the energy saving signal is an energy saving signal having both wake-up function and sleep function.

In an implementation, it is possible but not limited to use one bit to represent the type indication field. When the value of the one bit is 1, it indicates that the energy saving signal is the first energy saving signal; when the value of the one bit is 0, it indicates that the energy saving signal is the second energy saving signal; and when the one bit is not included, it indicates that the energy saving signal is an energy saving signal having both wake-up function and sleep function.

In one embodiment, the type indication field is represented by 2 bits. When the value of the 2 bits is 11, it indicates that the energy saving signal is the first energy saving signal; when the value of the 2 bits is 00, it indicates that the energy saving signal is the second energy saving signal; and when the value of the 2 bits is 10 or 01, it indicates that the energy saving signal is an energy saving signal having both wake-up function and sleep function.

Although the DCIs corresponding to different types of energy saving signals described above have the same length, the fields carried by the DCIs have different content.

For example, the first energy saving signal with wake-up function can not only indicate that the terminal needs to skip the detection of N PDCCHs, but also indicate the secondary carrier information to be activated, or the bandwidth information (Band Width Part (BWP)) to be switched, or whether to configure additional reference information, information related to beam management, etc.

The fields carried by the second energy saving signal mainly include the sleep function. The indication information of N PDCCHs that are skipped as indicated by the first energy saving signal with the wake-up function is also the sleep function, but the sleep function in the first energy saving signal with the wake-up function may be semi-statically configured to reduce the number of DCI bits. However, in the second energy saving signal with sleep function, and the UE is notified of the number of PDCCHs that do not need to be detected in a dynamic indication manner.

In one embodiment, in the second energy saving signal with sleep function, and the UE is notified of the number of PDCCHs that do not need to be detected in a dynamic indication manner. The sleep field of K (K is a positive integer) bits is taken as an example, which is represented as follows:

K full-zero bits [0 0 0 0 0 0 0 . . . 0] indicate that the terminal needs to continue detecting the next PDCCH;

K bits [0 0 0 . . . 1] indicate that the terminal needs to skip the detection of the next PDCCH;

K bits [0 0 0 . . . 1 0] indicate that the terminal needs to skip the detection of next two PDCCHs;

K full 1-bit sequence [1 1 1 . . . 1] indicates that the terminal needs to skip the detection opportunities of next $2^K-1$ PDCCHs, or indicates that no PDCCH detection is performed in the current DRX period.

It should be understood that the PDCCH that needs to skip detection refers to the PDCCH for data scheduling. In addition to the sleep field, the DCI corresponding to the second energy saving signal with the sleep function may also include the secondary carrier activation/deactivation information field to indicate the current activated carrier information and the subsequent activated carrier information to the terminal, and the information can be used for carrier activation or deactivation indication.

Third Embodiment

In this embodiment, the base station configures the first transmission opportunity in a first period and/or configures the second transmission opportunity in a second period for the terminal through higher-layer signaling/physical-layer signaling.

In this embodiment, the base station groups the UEs semi-statically or dynamically through higher-layer signaling or physical-layer signaling. The base station semi-statically configures the energy saving signal types of the energy saving signals. The above energy saving signal types include an energy saving signal based on group common PDCCH and an energy saving signal based on terminal-specific PDCCH, and the energy saving signals includes any one or a combination of the first energy saving signal and the second energy saving signal. Specifically, any of the following methods can be used.

1) Use the group common PDCCH transmitted periodically to transmit energy saving signals with wake-up function and sleep function simultaneously.

Here, the base station uses the first transmission opportunity to transmit the first energy saving signal with the wake-up function, and uses the second transmission opportunity to transmit the second energy saving signal with the sleep function. The first and second transmission opportunities may be the same or different.

When the first transmission opportunity is different from the second transmission opportunity, and the base station semi-statically configures one energy saving signal transmission period. The base station configures a part of transmission opportunities to transmit the energy saving signal with wake-up function based on group common PDCCH, and the other part of transmission opportunities to transmit the energy saving signal based on group common PDCCH. There may also be some transmission opportunities for skipping the detection of energy saving signals, that is, the base station transmits no energy saving signal on these signals.

The DCI field corresponding to the group common PDCCH includes at least a t1-bit wake-up field and a t2-bit sleep field. The wake-up field or the sleep field includes the wake-up operation information or sleep operation information of all or a part of the UEs in the packet.

The DCI field may also include a category indication field for distinguishing whether the signal is a first energy saving signal or a second energy saving signal. For example, when the signal is a first energy saving signal, the bit number t2 of the sleep field may be at least equal to 0; and conversely, when the signal is a second energy saving signal, the bit number t1 of the wake-up field t1 may be at least equal to 0.

The energy saving signal based on the group common PDCCH may have the following characteristics.

When the signal is a first energy saving signal, the UE may not be instructed to perform the sleep operation, for example, the sleep field may be set to zero or the bit number of the sleep field may be set to 0; when the signal is a second energy saving signal, it is not used to instruct the UE to perform the wake-up operation, for example, the wake-up field may be set to zero or the bit number of the wake-up field may be set to 0.

In one embodiment, the energy saving signal based on the group common PDCCH may only instruct the terminal to perform one of the wake-up operation and the sleep operation at one moment, or instruct different terminals to perform the wake-up operation and the sleep operation respectively at the same time.

When the energy saving signal based on the group common PDCCH simultaneously instructs different terminals to perform the wake-up operation and the sleep operation respectively at one moment, the wake-up field can instruct some UEs in the group to perform the wake-up operation, and the sleep field can instruct other UEs in the group to perform the sleep operation. The energy saving signals concentrate the sleep field and the wake-up field in the same DCI, reducing the UE detection complexity effectively.

2) The base station uses the first transmission opportunity to transmit the first energy saving signal carrying the wake-up function based on the group common PDCCH, and/or uses the second transmission opportunity to transmit the second energy saving signal carrying the sleep function based on the terminal-specific PDCCH (UE specific PDCCH).

The group common PDCCH carries the information that instructs one or more UEs in the group to perform the wake-up operation contained in the wake-up function; and the terminal-specific PDCCH carries the information that instructs a specific UE to perform the sleep operation contained in the sleep function. Specifically, the terminal-specific PDCCH carrying the second energy saving signal also carries a control information field for scheduling data.

3) When the base station uses the first transmission opportunity to transmit the first energy saving signal carrying the wake-up function based on the terminal-specific PDCCH and uses the second transmission opportunity to transmit the second energy saving signal carrying the sleep function based on the terminal-specific PDCCH, the first transmission opportunity and the second transmission The opportunities may be the same or different, specifically as follows.

(1) The DCI corresponding to the energy saving signal of the terminal-specific PDCCH includes at least a wake-up field of L1 bits and a sleep field of L2 bits, and: when the energy saving signal is a first energy saving signal, the bit number L2 of the sleep field can be at least equal to 0; and conversely, when the energy saving signal is a second energy saving signal, the bit number L1 of the wake-up field can be at least equal to 0.

Since it is impossible for the same terminal-specific energy saving signal to have the wake-up and sleep functions at the same time, and the base station configures different transmission opportunities for the first energy saving signal and the second energy saving signal, that is, the first transmission opportunity is different from the second transmission opportunity. For example, in the first transmission opportunity, the sleep field is set to the agreed known bits, such as full 0 bits, as frozen bits for polar decoding, so that the zero-set sleep field in the first energy saving signal will not be deteriorated as overhead while the PDCCH detection performance is very flexible. Similarly, the wake-up field may be set to zero in the second energy saving signal, and the terminal uses the wake-up field as the frozen bits of Polar codes for decoding.

The energy saving signal based on the terminal-specific PDCCH may or may not contain a control field for data scheduling.

When the energy saving signal based on the terminal-specific PDCCH does not contain the control field for data scheduling, if the DCI length corresponding to the energy saving signal based on the terminal-specific PDCCH is not equal to the DCI length configured by the base station, the zero-padding method is used so that the DCI length is equal to one of the scheduling DCI lengths configured by the base station semi-statically, such as one of the DCI lengths used for scheduling data, and the terminal decodes according to the zero-padded DCI when decoding.

If the MO of the energy saving signal based on the terminal-specific PDCCH is known, the terminal can set the zero-padding bits to the frozen bits when decoding. The advantage of this operation is that the DCI with a new length will not be added. Of course, the base station may also define a new DCI length, which is different from the length of the DCI for data scheduling and is specifically used for PDCCH-based energy saving signals.

In addition to using the zero-padding method described above to make the DCI length corresponding to the energy saving signal equal to the length of the existing DCI, another method is to use the reserved bit method to make its DCI length equal to one of the scheduling DCI lengths configured by the base station semi-statically. In the zero-padding method, the zero-padding bits are not calculated into the actual DCI length, while the reserved bit method is to use some bits in the DCI as reserved resources that occupy the actual DCI length. The advantage of using the reserved bit method for energy saving signals is to facilitate the standard backward compatibility. The method of firstly reserved bit and then zero padding may also be used. The reserved bit is consistent with zero padding, as long as the information is known before decoding can be used as the frozen bits of polar codes.

(2) When the energy saving signal based on the terminal-specific PDCCH is a first energy saving signal, the corresponding DCI does not include the sleep field; when the energy saving signal based on the terminal-specific PDCCH is a second energy saving signal, the corresponding DCI does not include the wake-up function field but may contain/not contain the control field for scheduling data.

In one embodiment, the base station configures different transmission opportunities for the first energy saving signal with wake-up function and the second energy saving signal with sleep function, that is, the first transmission opportunity is different from the second transmission opportunity.

(3) The foregoing energy saving signal can be based on both the group common PDCCH and the terminal-specific PDCCH.

The base station can semi-statically configure whether to use the energy saving signal based on the group common PDCCH or the energy saving signal based on the terminal-specific PDCCH. The base station can further instruct the first energy saving signal with wake-up function and the second energy saving signal with sleep function to be in the forms of group common PDCCH and terminal-specific PDCCH respectively.

The terminal detects the energy saving signal on the corresponding MO configured by the base station according to the instruction of the base station.

For example, when the load is heavy and there are a large number of users in the system, the base station can be configured to use an energy saving signal based on group common PDCCH to indicate the terminal, to facilitate saving the overhead; when the load is small and there are a large number of users in the system, the base station can be configured to use an energy saving signal based on specific PDCCH in group to indicate the terminal, to facilitate saving the energy, because there may be errors in the group waken up based on the terminal-specific PDCCH of the energy saving signal.

The difference between energy saving signals and scheduling PDCCH is: the energy saving signals can only be transmitted in the next DRX period once they blocks each other due to the PDCCH. Thus, in order to reduce the blocking probability of energy saving signals, each energy saving signal based on group common PDCCH can be transmitted on any OFDM symbol in each slot in the above 1)-3).

The first energy saving signal with the wake-up function may be an energy saving signal based on group common PDCCH. According to the standard, the group common PDCCH is only allowed to be transmitted on the first three symbols of each slot. Therefore, the following method 4) can also be used for transmission.

4) The first energy saving signal is an energy saving signal based on group common PDCCH, and the second energy saving signal is an energy saving signal based on group common PDCCH. The first energy saving signal and/or the second energy saving signal is/are transmitted to the terminal on the first three Orthogonal Frequency Division Multiplexing (OFDM) symbols in a slot.

Fourth Embodiment

In this embodiment, the base station configures the first transmission opportunity in a first period and/or configures the second transmission opportunity in a second period for the terminal through higher-layer signaling/physical-layer signaling.

The base station configures the designated bandwidth resources semi-statically for energy saving signals through higher-layer signaling or physical-layer signaling, and configures the transmission resources for the energy saving signals through RRC signaling on the designated bandwidth resources.

The first energy saving signal and the second energy saving signal may be carried by the same DCI, or may be carried by different DCIs. The specific embodiments are as follows.

(I) The first energy saving signal and the second energy saving signal are carried by the same DCI.

It should be understood that the first energy saving signal and second energy saving signal are carried by the same DCI, but the energy saving signals carried by the DCI may have only the wake-up function, or only the sleep function, or both the wake-up function and the sleep function.

One energy saving signal only instructs a designated terminal to perform the wake-up operation or sleep operation at one moment; or one energy saving signal simultaneously instructs different terminals to perform the wake-up operation and the sleep operations respectively at one moment.

The one energy saving signal includes a first energy saving signal and a second energy saving signal. When one energy saving signal simultaneously instructs different terminals to perform the wake-up operation and the sleep operation respectively at one moment, the one energy saving signal can instruct some terminals to perform the wake-up operation at one moment while instructing other terminals to perform the sleep operation.

The DCI may further include the control information for data scheduling to instruct the terminal to perform data scheduling.

When the first energy saving signal and the second energy saving signal are carried by the same DCI, the step in which the terminal configures the first transmission opportunity and/or configures the second transmission opportunity includes any one or a combination of:

1) configuring a first designated transmission opportunity as the first transmission opportunity through RRC signaling or in a pre-agreed manner;

2) configuring a second designated transmission opportunity as the second transmission opportunity through RRC signaling or in a pre-agreed manner.

It should be understood that the first designated transmission opportunity is completely different from the second designated transmission opportunity when only one of the first energy saving signal and the second energy saving signal is carried in the DCI.

When the DCI carries the first energy saving signal and the second energy saving signal at the same time, the first period is the same as the second period, and the first designated transmission opportunity is completely the same as the second designated transmission opportunity.

In the above method, the base station may configure a part of the transmission opportunities as the first transmission opportunities, and indicate that the other part of the transmission opportunities are the second transmission opportunities.

When the first energy saving signal and the second energy saving signal are carried by the same DCI, the terminal may further configure a third designated transmission opportunity as the transmission opportunity to instruct the terminal to skip the detection of energy saving signals through RRC signaling or in a pre-agreed manner when configuring the first transmission opportunity and/or configuring the second transmission opportunity.

The third designated transmission opportunity may be located between the first designated transmission opportunity and the second designated transmission opportunity, or may not be located between the first designated transmission opportunity and the second designated transmission opportunity. In one embodiment, the DCI carrying the first energy saving signal and the second energy saving signal can be configured by anyone or a combination of:

1) configuring energy saving signals and an occupant signal to jointly form DCI corresponding to a channel for transmitting the energy saving signals, and the energy saving signals include any one or a combination of the first energy saving signal and the second energy saving signal;

2) configuring energy saving signals to perform zero padding to form the DCI corresponding to a channel for transmitting the energy saving signals, and the energy saving signals include any one or a combination of the first energy saving signal and the second energy saving signal.

In one embodiment, the base station configures the energy saving signal type of the first energy saving signal and/or the second energy saving signal semi-statically, and the energy saving signal type includes an energy saving signal based on group common PDCCH and an energy saving signal based on terminal-specific PDCCH.

(II) The first energy saving signal and the second energy saving signal are carried by different DCIs.

The first energy saving signal is carried by the first DCI, and the second energy saving signal is carried by the second DCI.

The first DCI is configured to carry the energy saving signal based on group common PDCCH or the energy saving signal based on terminal-specific PDCCH.

The second DCI is configured to carry an energy saving signal based on terminal-specific PDCCH.

The function of using different DCIs to carry energy saving signals includes any one or a combination of:

1) the first energy saving signal carried by the first DCI is only used to instruct the terminal to perform the wake-up operation;

2) the second energy saving signal carried by the second DCI is used to instruct the terminal to perform the sleep operation or instruct the terminal to perform the sleep operation and perform data scheduling.

The first DCI carrying the first energy saving signal can be configured in any one or a combination of the following ways:

1) configuring energy saving signals and an occupant signal to jointly form DCI corresponding to a channel for transmitting the energy saving signals, and the energy saving signals include any one or a combination of the first energy saving signal and the second energy saving signal;

2) configuring energy saving signals to perform zero padding to form the DCI corresponding to a channel for transmitting the energy saving signals, and the energy saving signals include any one or a combination of the first energy saving signal and the second energy saving signal.

Embodiment 5

Based on the same inventive concept, this embodiment provides an energy saving signal transmission method applicable to the above terminal 302.

It should be understood that the energy saving signal transmission method applicable to the terminal 302 provided in the present application corresponds to the energy saving signal transmission method applicable to the base station 301 described above, that is, when the base station 301 adopts different methods and different transmission opportunities to transmit the energy saving signals, the energy saving signal transmission opportunity adopted by the terminal 302 is consistent with the transmission opportunity of the base station to transmit the energy saving signal, to perform the detection of the energy saving signal. The specific repetitions will not be described too much.

The above energy saving signal is a signal based on PDCCH transmission, and includes any one or a combination of:
a first energy saving signal with wake-up function;
a second energy saving signal with sleep function.

The above energy saving signal transmission method applicable to the terminal 302 specifically includes: a terminal detects a first energy saving signal according to a first transmission opportunity configured by a base station through higher-layer signaling/physical-layer signaling; and/or the terminal detects a second energy saving signal according to a second transmission opportunity configured by the base station through higher-layer signaling/physical-layer signaling.

In one embodiment, the terminal detects the first energy saving signal according to the first transmission opportunity configured by the base station in a first period through higher-layer signaling/physical-layer signaling, and/or the terminal detects the second energy saving signal according to the second transmission opportunity configured by the base station in a second period through higher-layer signaling/physical-layer signaling, and the first period is greater than the second period; or the first period is the same as the second period, and an offset corresponding to the first period is different from an offset corresponding to the second period; or the first period is the same as the second period, and an offset corresponding to the first period is the same as an offset corresponding to the second period.

In one embodiment, the first period is equal to a DRX period or a multiple of the DRX period, or the first period is less than the DRX period.

In one embodiment, when there are multiple first transmission opportunities in the DRX period, one first transmission opportunity is selected from the multiple first transmission opportunities to detect the first energy saving signal according to an instruction of the base station, or the first energy saving signal is detected on the multiple first transmission opportunities.

In one embodiment, when the base station transmits the first energy saving signal on multiple first transmission opportunities, the terminal stops detecting first energy saving signals on transmission opportunities other than a first transmission opportunity corresponding to one first energy saving signal when determining that the one first energy saving signal is successfully detected in the DRX period.

In one embodiment, the step in which the terminal detects the first energy saving signal according to the first transmission opportunity and/or detects the second energy saving signal according to the second transmission opportunity includes: the terminal detects the first energy saving signal according to a first preset number of first transmission opportunities configured by the base station in a specified period in the DRX period; and/or the terminals detects the second energy saving signal according to the second transmission opportunity after a designated transmission opportunity configured by the base station in a specified period in the DRX period.

In one embodiment, when detecting the first energy saving signal according to the first transmission opportunity and/or detecting the second energy saving signal according to the second transmission opportunity, the terminal further skips the detection of energy saving signals on a third transmission opportunity according to the third transmission opportunity configured by the base station.

In one embodiment, when detecting the first energy saving signal according to the first transmission opportunity and/or detecting the second energy saving signal according to the second transmission opportunity, the terminal searches in a search space corresponding to the first energy saving signal restricted by the base station, and the aggregation level corresponding to the search space does not exceed a preset aggregation level, and the total number of candidates corresponding to the aggregation level does not exceed the preset number of candidates.

In one embodiment, the energy saving signal types of the first energy saving signal and/or the second energy saving signal include an energy saving signal based on group common PDCCH and an energy saving signal based on terminal-specific PDCCH.

In one embodiment, the energy saving signal type of the first energy saving signal and/or the second energy saving signal is the energy saving signal based on group common PDCCH; and the step in which the terminal detects the first energy saving signal according to the first transmission opportunity and/or detects the second energy saving signal according to the second transmission opportunity includes: the terminal receives the first energy saving signal transmitted by the base station on any symbol in a slot by using the first transmission opportunity, and/or the terminal receives the second energy saving signal transmitted by the base station on any symbol in a slot by using the second transmission opportunity.

In one embodiment, the first energy saving signal and the second energy saving signal are carried by the same DCI or may be carried by different DCIs, which includes followings.

(1) The first energy saving signal and the second energy saving signal are carried by the same DCI.

In one embodiment, the terminal performs the wake-up operation or only the sleep operation according to an indication of one energy saving signal detected at one moment, and the one energy saving signal includes a first energy saving signal and a second energy saving signal.

In one embodiment, when detecting the first energy saving signal according to the first transmission opportunity and/or detecting the second energy saving signal according to the second transmission opportunity, the terminal further performs data scheduling according to the control information for data scheduling in the DCI.

In one embodiment, the step in which the terminal detects the first energy saving signal according to the first transmission opportunity and/or detects the second energy saving signal according to the second transmission opportunity includes: detecting the first energy saving signal according to a first designated transmission opportunity configured by the base station through RRC signaling or in a pre-agreed manner; and/or detecting the second energy saving signal according to a second designated transmission opportunity configured by the base station through RRC signaling or in a pre-agreed manner.

In one embodiment, when detecting the first energy saving signal according to the first transmission opportunity and/or detecting the second energy saving signal according to the second transmission opportunity, the terminal further skips the detection of energy saving signals on a third designated transmission opportunity configured by the base station through RRC signaling or in a pre-agreed manner.

In one embodiment, the same DCI carrying the first energy saving signal and the second energy saving signal or the first DCI carrying the first energy saving signal is constructed by anyone or a combination of:

the DCI corresponding to a channel for transmitting the energy saving signals is constituted of the DCI corresponding to the energy saving signals and the DCI corresponding to occupied resources jointly, and the energy saving signals include one or more of the first energy saving signal and the second energy saving signal;

the DCI corresponding to a channel for transmitting the energy saving signals is constituted of the DCI corresponding to the energy saving signals through zero padding and then channel coding, and the energy saving signals include one or more of the first energy saving signal and the second energy saving signal.

(2) The first energy saving signal and the second energy saving signal are carried by different DCIs.

In one embodiment, the first energy saving signal is carried by the first DCI, and the second energy saving signal is carried by the second DCI.

In one embodiment, the first DCI carries an energy saving signal based on group common PDCCH or an energy saving signal based on terminal-specific PDCCH; and the second DCI carries an energy saving signal based on terminal-specific PDCCH.

In one embodiment, the terminal performs only the wake-up operation according to an instruction of the first energy saving signal carried by the first DCI; and/or the terminal performs the sleep operation or performs the sleep operation and data scheduling according to an instruction of the second energy saving signal carried by the second DCI.

In one embodiment, the terminal receives energy saving signals according to designated bandwidth resources configured by the base station semi-statically for the energy saving signals through higher-layer signaling or physical-layer signaling as well as transmission resources configured by the base station through RRC signaling on the designated bandwidth resources, and the energy saving signals include the first energy saving signal and the second energy saving signal.

In one embodiment, the first DCI carrying the first energy saving signal is constructed by anyone or a combination of:

the DCI corresponding to a channel for transmitting the energy saving signals is constituted of the DCI corresponding to the energy saving signals and the DCI corresponding to occupied resources jointly, and the energy saving signals include one or more of the first energy saving signal and the second energy saving signal;

the DCI corresponding to a channel for transmitting the energy saving signals is constituted of the DCI corresponding to the energy saving signals through zero padding and then channel coding, and the energy saving signals include one or more of the first energy saving signal and the second energy saving signal.

Several specific embodiments of an energy saving signal transmission method applicable to the base station and terminal described above are given below.

Embodiment 6

Figure 8:
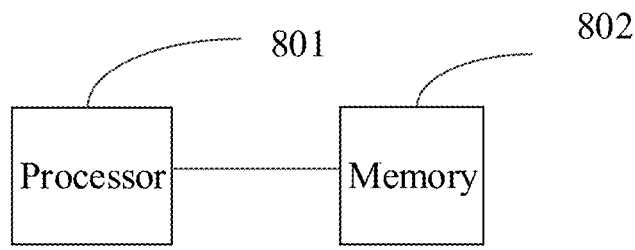
FIG. 8 is a schematic diagram of a network-side device for energy saving signal transmission provided by Embodiment 6 of the present application.

As shown in FIG. 8, this embodiment provides a network-side device for energy saving signal transmission, including: a processor 801 and a memory 802. The processor is responsible for managing the bus architecture and general processing, and the memory may store the data used by the processor when performing the operations. The transceiver is configured to receive and send the data under the control of the processor.

The bus architecture may include any numbers of interconnected buses and bridges, and specifically link various circuits of one or more processors represented by the processor and the memory represented by the memory. The bus architecture may further link various other circuits such as peripheral device, voltage regulator and power management circuit, which are all well known in the art and thus will not be further described again herein. The bus interface provides an interface. The processor is responsible for managing the bus architecture and general processing, and the memory may store the data used by the processor when performing the operations.

The procedure disclosed by the embodiment of the present application may be applied in the processor or implemented by the processor. In an implementation process, each step of the signal processing flow may be completed by the integrated logic circuit of hardware in the processor or the instruction in the form of software. The processor may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory, and the processor reads the information in the memory and completes the steps of the signal processing flow in combination with its hardware.

Here, the processor 801 is configured to read the program in the memory 802 and execute the following process: configuring a first transmission opportunity to transmit a first energy saving signal and/or configuring a second transmission opportunity to transmit a second energy saving signal for a terminal through higher-layer signaling/physical-layer signaling; and using the first transmission opportunity to transmit the first energy saving signal to the terminal, and/or using the second transmission opportunity to transmit the second energy saving signal to the terminal.

In one embodiment, the processor is specifically configured to: configure the first transmission opportunity in a first period and/or configure the second transmission opportunity in a second period for the terminal through higher-layer signaling/physical-layer signaling; and: the first period is greater than the second period; or the first period is the same as the second period, and an offset corresponding to the first period is different from an offset corresponding to the second period; or the first period is the same as the second period, and an offset corresponding to the first period is the same as an offset corresponding to the second period.

In one embodiment, the first period is equal to a DRX period or a multiple of the DRX period, or the first period is less than the DRX period.

In one embodiment, when there are multiple first transmission opportunities in the DRX period, the processor selects one of the multiple first transmission opportunities to transmit the first energy saving signal, or sends the first energy saving signal on the multiple first transmission opportunities.

In one embodiment, when sending the first energy saving signal on the multiple first transmission opportunities, the processor is further configured to: determine the maximum number of first transmission opportunities allowed to transmit the first energy saving signal during a DRX ON period through the semi-static configuration of RRC signaling or in a pre-agreed manner.

In one embodiment, when configuring the first transmission opportunity and/or configuring the second transmission opportunity for the terminal, the processor is configured to: configure a first preset number of first transmission opportunities for the terminal in periodic transmission opportunities; and/or configure a transmission opportunity after a designated transmission opportunity for the terminal as the second transmission opportunity in periodic transmission opportunities.

In one embodiment, when configuring the first transmission opportunity and/or configuring the second transmission opportunity for the terminal, the processor is further configured to: configure a third transmission opportunity to instruct the terminal to skip the detection of energy saving signals for the terminal.

In one embodiment, the processor is further configured to: restrict a search space corresponding to the first energy saving signal, so that the aggregation level corresponding to the search space does not exceed a preset aggregation level and the total number of candidates corresponding to the aggregation level does not exceed the preset number of candidates.

In one embodiment, the processor is further configured to: configure an energy saving signal type of the first energy saving signal and/or the second energy saving signal semi-statically, and the energy saving signal type includes an energy saving signal based on group common PDCCH and an energy saving signal based on terminal-specific PDCCH.

In one embodiment, the energy saving signal type of the first energy saving signal and/or the second energy saving signal is the energy saving signal based on group common PDCCH; and when using the first transmission opportunity to transmit the first energy saving signal to the terminal and/or using the second transmission opportunity to transmit the second energy saving signal to the terminal, the processor is specifically configured to: use the first transmission opportunity to transmit the first energy saving signal to the terminal on any symbol in a slot, and/or use the second transmission opportunity to transmit the second energy saving signal to the terminal on any symbol in a slot.

In one embodiment, the first energy saving signal and the second energy saving signal are carried by the same DCI.

In one embodiment, one energy saving signal only instructs a designated terminal to perform a wake-up operation or sleep operation at one moment, and the one energy saving signal includes a first energy saving signal and a second energy saving signal; or one energy saving signal simultaneously instructs different terminals to perform a wake-up operation and a sleep operations respectively at one moment, and the one energy saving signal includes a first energy saving signal and a second energy saving signal.

In one embodiment, the DCI further includes the control information for data scheduling.

In one embodiment, when configuring the first transmission opportunity and/or configuring the second transmission opportunity for the terminal, the processor is configured to: configure a first designated transmission opportunity as the first transmission opportunity through RRC signaling or in a pre-agreed manner; and/or configure a second designated transmission opportunity as the second transmission opportunity through RRC signaling or in a pre-agreed manner.

In one embodiment, the processor is further configured to: configure a third designated transmission opportunity to instruct the terminal to skip the detection of energy saving signals through RRC signaling or in a pre-agreed manner.

In one embodiment, the first energy saving signal is carried by the first DCI, and the second energy saving signal is carried by the second DCI.

In one embodiment, the processor is further configured to: configure the first DCI to carry the energy saving signal based on group common PDCCH or the energy saving signal based on terminal-specific PDCCH; and configure the second DCI to carry an energy saving signal based on terminal-specific PDCCH.

In one embodiment, the first energy saving signal carried by the first DCI is only used to instruct the terminal to perform a wake-up operation; and/or the second energy saving signal carried by the second DCI is used to instruct the terminal to perform a sleep operation or instruct the terminal to perform a sleep operation and perform data scheduling.

In one embodiment, the processor constructs the same DCI carrying the first energy saving signal and the second energy saving signal or the first DCI carrying the first energy saving signal by anyone or a combination of: configuring energy saving signals and an occupant signal to jointly form DCI corresponding to a channel for transmitting the energy saving signals, and the energy saving signals include one or more of the first energy saving signal and the second energy saving signal; configuring energy saving signals to perform zero padding to form DCI corresponding to a channel for transmitting the energy saving signals, and the energy saving signals include one or more of the first energy saving signal and the second energy saving signal.

In one embodiment, the processor configures designated bandwidth resources semi-statically for energy saving signals through higher-layer signaling or physical-layer signaling, and configures transmission resources for the energy saving signals through RRC signaling on the designated bandwidth resources, and the energy saving signals include the first energy saving signal and the second energy saving signal.

Figure 9:
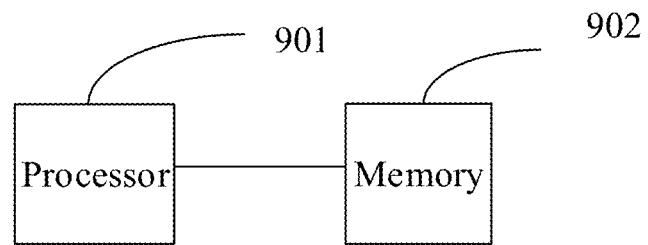
FIG. 9 is a schematic diagram of a terminal for energy saving signal transmission provided by Embodiment 6 of the present application.

As shown in FIG. 9, this embodiment further provides a terminal for energy saving signal transmission, including a processor 901 and a memory 902. The processor is responsible for managing the bus architecture and general processing, and the memory may store the data used by the processor when performing the operations. The transceiver is configured to receive and send the data under the control of the processor.

The bus architecture may include any numbers of interconnected buses and bridges, and specifically link various circuits of one or more processors represented by the processor and the memory represented by the memory. The bus architecture may further link various other circuits such as peripheral device, voltage regulator and power management circuit, which are all well known in the art and thus will not be further described again herein. The bus interface provides an interface. The processor is responsible for managing the bus architecture and general processing, and the memory may store the data used by the processor when performing the operations.

The procedure disclosed by the embodiment of the present application may be applied in the processor or implemented by the processor. In an implementation process, each step of the signal processing flow may be completed by the integrated logic circuit of hardware in the processor or the instruction in the form of software. The processor may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory, and the processor reads the information in the memory and completes the steps of the signal processing flow in combination with its hardware.

Here, the processor 901 is configured to read the program in the memory 902 and execute the following process: detecting a first energy saving signal according to a first transmission opportunity configured by a base station through higher-layer signaling/physical-layer signaling; and/or detecting a second energy saving signal according to a second transmission opportunity configured by the base station through higher-layer signaling/physical-layer signaling.

In one embodiment, when detecting the first energy saving signal according to the first transmission opportunity and/or detecting the second energy saving signal according to the second transmission opportunity, the processor is specifically configured to: detect the first energy saving signal according to the first transmission opportunity configured by the base station in a first period through higher-layer signaling/physical-layer signaling; and/or detect the second energy saving signal according to the second transmission opportunity configured by the base station in a second period through higher-layer signaling/physical-layer signaling, and the first period is greater than the second period; or the first period is the same as the second period, and an offset corresponding to the first period is different from an offset corresponding to the second period; or the first period is the same as the second period, and an offset corresponding to the first period is the same as an offset corresponding to the second period.

In one embodiment, the first period is equal to a DRX period or a multiple of the DRX period, or the first period is less than the DRX period.

In one embodiment, when there are multiple first transmission opportunities in the DRX period, the processor selects one of the multiple first transmission opportunities to detect the first energy saving signal according to an instruction of the base station, or detects the first energy saving signal on the multiple first transmission opportunities.

In one embodiment, the processor is further configured to: when determining that one first energy saving signal is successfully detected in the DRX period, stop detecting first energy saving signals on transmission opportunities other than a first transmission opportunity corresponding to the one first energy saving signal.

In one embodiment, when detecting the first energy saving signal according to the first transmission opportunity and/or detecting the second energy saving signal according to the second transmission opportunity, the processor is specifically configured to: detect the first energy saving signal according to a first preset number of first transmission opportunities configured by the base station in a specified period in the DRX period; and/or detect the second energy saving signal according to the second transmission opportunity after a designated transmission opportunity configured by the base station in a specified period in the DRX period.

In one embodiment, when detecting the first energy saving signal according to the first transmission opportunity and/or detecting the second energy saving signal according to the second transmission opportunity, the processor is further configured to: skip the detection of energy saving signals on a third transmission opportunity according to the third transmission opportunity configured by the base station.

In one embodiment, the processor is further configured to: search in a search space corresponding to the first energy saving signal restricted by the base station, and the aggregation level corresponding to the search space does not exceed a preset aggregation level and the total number of candidates corresponding to the aggregation level does not exceed the preset number of candidates.

In one embodiment, the processor is further configured to: energy saving signal types of the first energy saving signal and/or the second energy saving signal include an energy saving signal based on group common PDCCH and an energy saving signal based on terminal-specific PDCCH.

In one embodiment, the energy saving signal type of the first energy saving signal and/or the second energy saving signal is the energy saving signal based on group common PDCCH; and when detecting the first energy saving signal according to the first transmission opportunity and/or detecting the second energy saving signal according to the second transmission opportunity, the processor is specifically configured to: receive the first energy saving signal transmitted by the base station on any symbol in a slot by using the first transmission opportunity, and/or receive the second energy saving signal transmitted by the base station on any symbol in a slot by using the second transmission opportunity.

In one embodiment, the first energy saving signal and the second energy saving signal are carried by the same DCI.

In one embodiment, the processor is further configured to: perform a wake-up operation or only a sleep operation according to an indication of one energy saving signal detected at one moment, and the one energy saving signal includes a first energy saving signal and a second energy saving signal.

In one embodiment, when detecting the first energy saving signal according to the first transmission opportunity and/or detecting the second energy saving signal according to the second transmission opportunity, the processor is further configured to: perform data scheduling according to the control information for data scheduling in the DCI.

In one embodiment, when detecting the first energy saving signal according to the first transmission opportunity and/or detecting the second energy saving signal according to the second transmission opportunity, the processor is specifically configured to: detect the first energy saving signal according to a first designated transmission opportunity configured by the base station through RRC signaling or in a pre-agreed manner; and/or detect the second energy saving signal according to a second designated transmission opportunity configured by the base station through RRC signaling or in a pre-agreed manner.

In one embodiment, when detecting the first energy saving signal according to the first transmission opportunity and/or detecting the second energy saving signal according to the second transmission opportunity, the processor is further configured to: skip the detection of energy saving signals on a third designated transmission opportunity configured by the base station through RRC signaling or in a pre-agreed manner.

In one embodiment, the first energy saving signal is carried by the first DCI, and the second energy saving signal is carried by the second DCI.

In one embodiment, the processor is further configured to: the first DCI carries an energy saving signal based on group common PDCCH or an energy saving signal based on terminal-specific PDCCH; and the second DCI carries an energy saving signal based on terminal-specific PDCCH.

In one embodiment, the processor is further configured to: perform only a wake-up operation according to an instruction of the first energy saving signal carried by the first DCI; and/or perform a sleep operation or performing a sleep operation and data scheduling according to an instruction of the second energy saving signal carried by the second DCI.

In one embodiment, the processor is specifically further configured to: receive energy saving signals according to designated bandwidth resources configured by the base station semi-statically for the energy saving signals through higher-layer signaling or physical-layer signaling as well as transmission resources configured by the base station through RRC signaling on the designated bandwidth resources, and the energy saving signals include the first energy saving signal and the second energy saving signal.

In one embodiment, the same DCI carrying the first energy saving signal and the second energy saving signal or the first DCI carrying the first energy saving signal is constructed by anyone or a combination of: the DCI corresponding to a channel for transmitting the energy saving signals is constituted of the DCI corresponding to the energy saving signals and the DCI corresponding to occupied resources jointly, and the energy saving signals include one or more of the first energy saving signal and the second energy saving signal; the DCI corresponding to a channel for transmitting the energy saving signals is constituted of the DCI corresponding to the energy saving signals through zero padding and then channel coding, and the energy saving signals include one or more of the first energy saving signal and the second energy saving signal.

In one embodiment, the processor is further configured to: take bits for zero padding or bits of the occupied resources in the DCI as frozen bits of polar codes.

Figure 10:
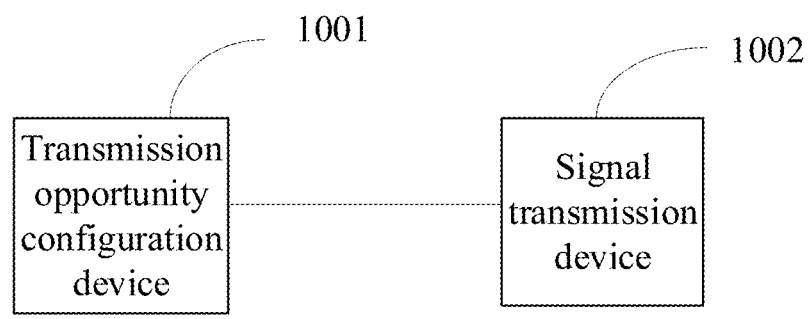
FIG. 10 is a schematic diagram of a network-side device for an energy saving signal provided by Embodiment 6 of the present application.

Based on the same inventive concept, as shown in FIG. 10, a terminal device for energy saving signal transmission in this embodiment includes: a transmission opportunity configuration device 1001 configured to configure a first transmission opportunity to transmit a first energy saving signal and/or configure a second transmission opportunity to transmit a second energy saving signal for a terminal through higher-layer signaling/physical-layer signaling; and a signal transmission device 1002 configured to use the first transmission opportunity to transmit the first energy saving signal to the terminal and/or use the second transmission opportunity to transmit the second energy saving signal to the terminal.

In one embodiment, the transmission opportunity configuration device is configured to: configure the first transmission opportunity in a first period and/or configure the second transmission opportunity in a second period for the terminal through higher-layer signaling/physical-layer signaling; and: the first period is greater than the second period; or the first period is the same as the second period, and an offset corresponding to the first period is different from an offset corresponding to the second period; or the first period is the same as the second period, and an offset corresponding to the first period is the same as an offset corresponding to the second period.

Figure 11:
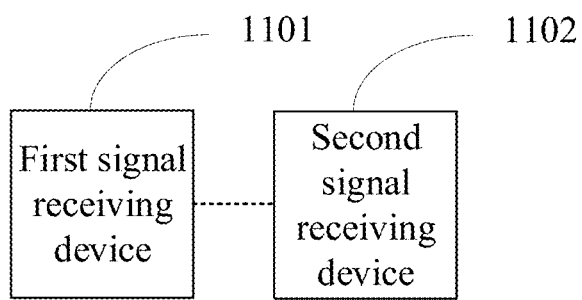
FIG. 11 is a schematic diagram of a terminal device for an energy saving signal provided by Embodiment 6 of the present application.

Based on the same inventive concept, as shown in FIG. 11, a network-side device for energy saving signal transmission in this embodiment includes: a first signal receiving device 1101 configured to detect a first energy saving signal according to a first transmission opportunity configured by a base station through higher-layer signaling/physical-layer signaling; and/or a second signal receiving device 1102 configured to detect a second energy saving signal according to a second transmission opportunity configured by the base station through higher-layer signaling/physical-layer signaling.

Embodiment 7

An embodiment of the present application further provides a computer-readable non-volatile storage medium including program codes. When the program codes run on a computing terminal, the program codes are configured to cause the computing terminal to perform the steps of the method of the Embodiment 1 of the present application described above.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing device to produce a machine, so that the instructions executed by the computer processor and/or another programmable data processing device create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. An energy saving signal transmission method, comprises:
    configuring at least one of a first transmission opportunity to transmit a first energy saving signal or a second transmission opportunity to transmit a second energy saving signal for a terminal through a higher-layer signaling or a physical-layer;
    using at least one of the first transmission opportunity to transmit the first energy saving signal to the terminal, or the second transmission opportunity to transmit the second energy saving signal to the terminal;
    wherein the configuring at least one of a first transmission opportunity or a second transmission opportunity for a terminal through a higher-layer signaling or a physical-layer, comprises:
    configuring at least one of the first transmission opportunity with a first period or the second transmission opportunity with a second period for the terminal through a higher-layer signaling or a physical-layer;
    wherein a size of the first period is greater than a size of the second period, and the size of the second period is the same as a size of a Physical Downlink Control Channel, PDCCH period for data scheduling; or
    the size of the first period is same as the size of the second period, and an offset corresponding to the first period is different from an offset corresponding to the second period; or
    the size of the first period is same as the size of the second period, and an offset corresponding to the first period is same as an offset corresponding to the second period;
    wherein the size of the first period is equal to a size of a Discontinuous Reception, DRX, period or a multiple of the DRX period, or the size of the first period is less than a size of the DRX period.

2. The method of claim 1, wherein the using the first transmission opportunity to transmit the first energy saving signal to the terminal, comprises:
in response to there are multiple first transmission opportunities in the DRX period, selecting one of the multiple first transmission opportunities to transmit the first energy saving signal, or transmitting the first energy saving signal on the multiple first transmission opportunities.

3. The method of claim 2, wherein in response to transmitting the first energy saving signal on the multiple first transmission opportunities, the method comprises:
determining a maximum number of first transmission opportunities allowed to transmit the first energy saving signal during a Discontinuous Reception ON, DRX ON, period through a semi-static configuration of Radio Resource Control, RRC, signaling or in a pre-agreed manner.

4. The method of claim 1, wherein the configuring at least one of a first transmission opportunity to transmit a first energy saving signal or configuring a second transmission opportunity to transmit a second energy saving signal for a terminal, comprises at least one of:
configuring a first preset number of first transmission opportunities for the terminal in periodic transmission opportunities; or
configuring a transmission opportunity after a designated transmission opportunity for the terminal as the second transmission opportunity in periodic transmission opportunities.

5. The method of claim 1, comprises:
configuring a third transmission opportunity to instruct the terminal to skip a detection of energy saving signals for the terminal.

6. The method of claim 1, comprises at least one of:
configuring at least one of an energy saving signal type of the first energy saving signal or the second energy saving signal semi-statically, wherein the energy saving signal type comprises an energy saving signal based on group common PDCCH and an energy saving signal based on terminal-specific PDCCH; or
configuring a first DCI to carry the energy saving signal based on group common PDCCH or the energy saving signal based on terminal-specific PDCCH; configuring a second DCI to carry an energy saving signal based on terminal-specific PDCCH.

7. The method of claim 1, wherein the first energy saving signal and the second energy saving signal are carried by a same Downlink Control Information, DCI, or
the first energy saving signal is carried by first DCI, and the second energy saving signal is carried by second DCI.

8. The method of claim 7, wherein one energy saving signal only instructs a designated terminal to perform a wake-up operation or a sleep operation at one moment, wherein the one energy saving signal comprises the first energy saving signal and the second energy saving signal; or
one energy saving signal simultaneously instructs different terminals to perform a wake-up operation and a sleep operations respectively at one moment, wherein the one energy saving signal comprises the first energy saving signal and the second energy saving signal.

9. An energy saving signal transmission method, comprises at least one of:
detecting a first energy saving signal according to a first transmission opportunity configured by a base station through a higher-layer signaling or a physical-layer; or
detecting a second energy saving signal according to a second transmission opportunity configured by the base station through a higher-layer signaling or a physical-layer;
wherein at least one of the detecting a first energy saving signal according to a first transmission opportunity or detecting a second energy saving signal according to a second transmission opportunity, comprises at least one of:
detecting the first energy saving signal according to the first transmission opportunity configured by the base station with a first period through a higher-layer signaling or a physical-layer; or
detecting the second energy saving signal according to the second transmission opportunity configured by the base station with a second period through a higher-layer signaling or a physical-layer;
wherein a size of the first period is greater than a size of the second period, and the size of the second period is the same as a size of a Physical Downlink Control Channel, PDCCH period for data scheduling; or
the size of the first period the same as the size of the second period, and an offset corresponding to the first period is different from an offset corresponding to the second period; or
the size of the first period is same as the size of the second period, and an offset corresponding to the first period is the same as an offset corresponding to the second period;
wherein the size of the first period is equal to a size of a Discontinuous Reception, DRX, period or a multiple of the DRX period, or the size of the first period is less than a size of the DRX period.

10. The method of claim 9, wherein in response to there are multiple first transmission opportunities in the DRX period, one first transmission opportunity is selected from the multiple first transmission opportunities according to an instruction of the base station to detect the first energy saving signal, or the first energy saving signal is detected on the multiple first transmission opportunities.

11. The method of claim 9, comprises:
in response to determining that one first energy saving signal is successfully detected in the DRX period, stopping detecting first energy saving signals on transmission opportunities other than a first transmission opportunity corresponding to the one first energy saving signal.

12. The method of claim 9, wherein at least one of the detecting the first energy saving signal according to the first transmission opportunity configured by the base station in a first period through a higher-layer signaling or a physical-layer, or detecting the second energy saving signal according to the second transmission opportunity configured by the base station in a second period through a higher-layer signaling or a physical-layer, comprises at least one of:
detecting the first energy saving signal according to a first preset number of first transmission opportunities configured by the base station in a specified period in the DRX period; or
detecting the second energy saving signal according to the second transmission opportunity after a designated transmission opportunity configured by the base station in a specified period in the DRX period.

13. The method of claim 9, comprises:
skipping a detection of energy saving signals on a third transmission opportunity according to the third transmission opportunity configured by the base station.

14. The method of claim 9, wherein at least one of energy saving signal types of the first energy saving signal or the second energy saving signal comprises an energy saving signal based on group common PDCCH and an energy saving signal based on terminal-specific PDCCH, or the first DCI carries an energy saving signal based on group common PDCCH or an energy saving signal based on terminal-specific PDCCH; the second DCI carries an energy saving signal based on terminal-specific PDCCH.

15. The method of claim 9, wherein the first energy saving signal and the second energy saving signal are carried by a same Downlink Control Information, DCI, or the first energy saving signal is carried by a first DCI, and the second energy saving signal is carried by a second DCI.

16. The method of claim 15, comprises:

performing a wake-up operation or a sleep operation according to an indication of one energy saving signal detected at one moment, wherein the one energy saving signal comprises the first energy saving signal and the second energy saving signal.

17. A network-side device for energy saving signal transmission, comprises a processor, a memory and a transceiver;

the transceiver is configured to receive and send information under control of the processor;

the memory stores computer instructions;

the processor is configured to read the computer instructions in the memory to execute the energy saving signal transmission method of claim 1.

18. A terminal for energy saving signal transmission, comprises a processor, a memory and a transceiver;

the transceiver is configured to receive and send information under control of the processor;

the memory stores computer instructions;

the processor is configured to read the computer instructions in the memory to execute the energy saving signal transmission method of claim 9.

* * * * *